(12) United States Patent
Knechtges et al.

(10) Patent No.: US 9,085,289 B2
(45) Date of Patent: Jul. 21, 2015

(54) METHOD OF OPERATING AN ELECTRICALLY CONTROLLABLE BRAKE SYSTEM AND BRAKE SYSTEM WHICH IS OPERATED ACCORDING TO THE METHOD

(75) Inventors: Josef Knechtges, Mayen (DE); Frank Heller, Boppard (DE); Thomas Bach, Wolken (DE)

(73) Assignee: Lucas Automotive GmbH, Koblenz (DE)

( * ) Notice: Subject to any disclaimer, the term of this patent is extended or adjusted under 35 U.S.C. 154(b) by 262 days.

(21) Appl. No.: 13/812,655

(22) PCT Filed: Jul. 25, 2011

(86) PCT No.: PCT/EP2011/003722
§ 371 (c)(1),
(2), (4) Date: Apr. 3, 2013

(87) PCT Pub. No.: WO2012/013328
PCT Pub. Date: Feb. 2, 2012

(65) Prior Publication Data
US 2013/0226424 A1    Aug. 29, 2013

(30) Foreign Application Priority Data
Jul. 30, 2010    (DE) .................. 10 2010 032 929

(51) Int. Cl.
*G06F 7/70*    (2006.01)
*G06F 19/00*    (2011.01)
(Continued)

(52) U.S. Cl.
CPC .............. *B60T 17/221* (2013.01); *B60T 8/36* (2013.01); *B60T 8/365* (2013.01); *B60T 8/4059* (2013.01); *B60T 8/90* (2013.01); *B60T 13/683* (2013.01)

(58) Field of Classification Search
CPC ........ B60T 8/36; B60T 8/365; B60T 17/221; B60T 8/90; B60T 13/683; B60T 8/4059; B60T 17/22
USPC .................. 701/70, 78, 83, 33.1; 251/129.01, 251/129.13; 303/151, 166; 475/120, 121, 475/123, 127, 132
See application file for complete search history.

(56) References Cited

U.S. PATENT DOCUMENTS 5,458,406 A * 10/1995 Hall ............................ 303/113.2
5,494,345 A *  2/1996 Inagaki et al. ................ 303/163
(Continued)

FOREIGN PATENT DOCUMENTS

DE    4439890 A1    5/1996
DE    10221456 A1    2/2003
(Continued)

*Primary Examiner* — Dalena Tran
*Assistant Examiner* — Jaime Figueroa
(74) *Attorney, Agent, or Firm* — MacMillan, Sobanski & Todd, LLC (57) ABSTRACT

A method for operating an electrically controllable brake system for a motor vehicle having at least one electrically actuated valve arrangement for setting a pressure difference between a second brake pressure and a first brake pressure, wherein in a first time interval a predetermined first pressure difference is set and an associated first power consumption value of the pump is identified; in a second time interval a predetermined second pressure difference is set and an associated second power consumption value of the pump is identified; a correction value is obtained from the first power consumption value and the second power consumption value; the correction value is taken into account for setting a setpoint value for the pressure difference.

36 Claims, 4 Drawing Sheets

(51) Int. Cl.
  *G06G 7/00* (2006.01)
  *G06G 7/76* (2006.01)
  *B60T 17/22* (2006.01)
  *B60T 8/36* (2006.01)
  *B60T 8/40* (2006.01)
  *B60T 8/90* (2006.01)
  *B60T 13/68* (2006.01)

(56) References Cited

U.S. PATENT DOCUMENTS

| | | | | |
|---|---|---|---|---|
| 6,030,055 | A * | 2/2000 | Schubert | 303/113.4 |
| 6,322,164 | B1 * | 11/2001 | Sakamoto et al. | 303/115.4 |
| 6,499,813 | B1 * | 12/2002 | Wandel | 303/115.4 |
| 8,301,331 | B2 * | 10/2012 | Attallah et al. | 701/29.1 |
| 2001/0009880 | A1 * | 7/2001 | Suzuki et al. | 475/122 |
| 2007/0210648 | A1 * | 9/2007 | Sato et al. | 303/155 |
| 2007/0252098 | A1 * | 11/2007 | Schmidt et al. | 251/129.01 |
| 2009/0299597 | A1 * | 12/2009 | Heller et al. | 701/79 |
| 2011/0184606 | A1 * | 7/2011 | Attallah et al. | 701/29 |

FOREIGN PATENT DOCUMENTS

| | | |
|---|---|---|
| DE | 10247651 A1 | 4/2004 |
| DE | 102005026740 A1 | 12/2006 |
| DE | 102006029160 A1 | 12/2007 |
| DE | 102006040127 A1 | 3/2008 |
| DE | 102010028083 A1 | 11/2010 |
| WO | 9519282 A1 | 7/1995 |
| WO | 2005054028 A1 | 6/2005 |

* cited by examiner

METHOD OF OPERATING AN ELECTRICALLY CONTROLLABLE BRAKE SYSTEM AND BRAKE SYSTEM WHICH IS OPERATED ACCORDING TO THE METHOD

CROSS-REFERENCE TO RELATED APPLICATIONS

This application is a national stage of International Application No. PCT/EP2011/003722 filed Jul. 25, 2011, the disclosures of which are incorporated herein by reference in entirety, and which claimed priority to German Patent Application No. DE 10 2010 032 929.0 filed Jul. 30, 2010, the disclosures of which are incorporated herein by reference in their entirety.

BACKGROUND OF THE INVENTION

The invention relates to a method for operating an electrically controllable brake system for a motor vehicle with a master cylinder for generating a first brake pressure, with an electrically driven pump for generating a second brake pressure, and with at least one electrically driven valve arrangement for setting a pressure difference between the second brake pressure and the first brake pressure, and also to a method for operating an electrically controllable brake system for a motor vehicle with wheel cylinders in which a first brake pressure is generated, with an electrically driven pump for generating a second brake pressure, and with at least one electrically driven valve arrangement for setting a pressure difference between the second brake pressure and the first brake pressure. The invention also relates to an electrically controllable brake system that is operated in accordance with such methods.

From DE 102 47 651 A1 an electrically controllable brake system is known in which both the shut-off valves of each brake circuit, which are arranged between the master cylinder and the output of the pump, and also inlet valves assigned to the wheel brakes, which are arranged between the output of the pump and the respective wheel cylinder, take the form of electrically driven valve arrangements which have been designed for setting a pressure difference. A valve arrangement of such a type is known from DE 44 39 890 A10, and corresponding U.S. Pat. No. 6,120,003, both of which are incorporated by reference herein in entirety. Furthermore, from DE 10 2005 026 740 A1, and corresponding U.S. Pat. No. 8,271,172 B2, both of which are incorporated by reference herein in entirety, a method for driving a valve arrangement of such a type is known, according to which a setting of the pressure difference that is as accurate as possible is effected, so that brake pressures that are as accurate as possible are also generated, in order to obtain, particularly in automatic brake systems, a comfortable sequence of operations, for example without jerky movements and/or pulling of the vehicle.

The setting of a set-point value for the pressure difference and, besides that, the generating or setting of the desired brake pressures are ordinarily effected in a manner depending on the electric drive of the valve arrangement. For this purpose, in the electronic control unit of the brake system, for example, a characteristic map is saved, according to which the pressure difference can be controlled or regulated as a function of the electric current supplied to the valve arrangement.

In this connection there is the problem that the functional relationship between pressure difference and electric drive may be subject to considerable variabilities which result from the manufacturing tolerances of the hydraulic, mechanical and electrical/electronic system components involved. Added to these are tolerances that result from the ageing process and from wear of the system components in operation.

BRIEF SUMMARY OF THE INVENTION

A feature of the invention is therefore to counteract the problem that has been described.

With a view to achieving the feature, for the purpose of operating an aforementioned electrically controllable brake system it is proposed that in a first time-interval a predetermined first pressure difference is set and an associated first power consumption of the pump is ascertained; in a second time-interval a predetermined second pressure difference is set and an associated second power consumption of the pump is ascertained; a correction value is ascertained from the first power consumption and the second power consumption; the correction value is taken into consideration for the purpose of setting a set-point value for the pressure difference.

In this way a calibration of the brake system is undertaken, the functional principle being as follows. The ascertaining of the power consumption of the pump is effected by means of the electric motor driving the pump, which acts as a converter of electrical energy into mechanical energy. This is because the mechanical energy that is required for driving the pump by way of load has to be supplied in the form of electrical energy. In this connection the electric motor, depending on its type of construction, generates a defined rotational speed and outputs a defined torque. If the load is changed by the pressure difference being changed, the rotational speed changes correspondingly if the electrical energy supplied remains unchanged. This means that the rotational speed falls if the load is increased by increasing the pressure difference, and that the rotational speed rises if the load is reduced by reducing the pressure difference. Now the change in the rotational speed can be compensated or corrected by changing the electrical energy supplied. That is to say, in order to compensate for a fall in rotational speed the electrical energy supply has to be increased, and in order to compensate for a rise in rotational speed the electrical energy supply has to be reduced. All this is reflected in the power consumption of the pump or of the electric motor driving the pump.

In accordance with the invention at least two load cases are considered. For this purpose, in each instance in a time-interval a predetermined pressure difference is set, and the associated power consumption of the pump is ascertained. Since in the time-intervals different pressure differences are set in each instance, different power consumptions of the pump also arise in each instance. In order to infer the actual load for the purpose of driving the pump, and hence to infer the brake pressures actually generated, a correction value or calibration value is ascertained from the different power consumptions. This correction value is saved in the electronic control unit of the brake system and can consequently be taken into consideration at any time in the course of electric drives of the valve arrangement for the purpose of setting a set-point value for the pressure difference.

The great advantage of the method according to the invention consists in the fact that it can be carried out not just a single time, for example in the course of the so-called end-of-line testing at the end of production, but, in principle, at any time during operation of the brake system. Even an exchange of the electronic control unit of the brake system is possible, since after the exchange a new calibration of the brake system by ascertaining or updating the correction value can be undertaken by means of the method according to the invention. This can be effected, for example, within the scope of a workshop mode or diagnostic mode.

In order, however, to counteract the ageing process of the system components, in preferred manner the method according to the invention is carried out at regular time-intervals which arise, for example, in a manner depending on the distance traveled by the vehicle and/or on the operating-time of the vehicle and/or on the operating-time of the brake system. Consequently a regular updating of the correction value is guaranteed.

For safety reasons there is provision that an immediate termination of the method according to the invention takes place if a braking operation initiated by the driver of the vehicle and/or an automatic braking operation occurs, since service braking operations have priority. For this reason there may also be provision that a termination of the method according to the invention already takes place when a braking operation is imminent—that is to say, for example, when the driver begins to ease off the accelerator pedal.

In preferred manner, ratios of the previously ascertained power consumptions of the pump are derived for the purpose of ascertaining the correction value. Alternatively, differences may be derived from the previously ascertained power consumptions for the purpose of ascertaining the correction value.

The method according to the invention is not only suitable for calibrating the brake system but also enables inferences to be drawn about the presence of a system error, inter alia when a value for the correction value is ascertained that does not lie within a predetermined range. If a system error is detected in this way, an error code can be saved in the electronic control unit, and the brake system can be switched to a safer state.

Ideally, in one of the load cases that are considered in connection with the method according to the invention the pressure difference is set to a value of the order of magnitude zero, so that in the associated time-interval the power consumption of the pump is ascertained for a substantially no-load state.

Moreover, there is provision that the time-intervals in which the power consumption of the pump is ascertained are each of identical duration, in order to offer a uniform basis in connection with the ascertainment or calculation of the correction value from the ascertained power consumptions of the pump, so that the actual ascertainment of the correction value or of the power consumption can be carried out in relatively straightforward manner. Alternatively, the time-intervals may be of varying duration, but this must then be taken into consideration in the ascertainment of the correction value or of the power consumptions.

Furthermore, there is provision that the pump is driven in such a way that in each of the time-intervals in which the power consumption of the pump is ascertained a rate of delivery of the same magnitude is achieved. This means that the electrical energy supplied to the electric motor driving the pump is changed in such a way that changes in the rotational speed of the pump brought about by reason of the change of load are compensated or corrected. Alternatively, the pump can be driven in such a way that rates of delivery of differing magnitude can be achieved in each of the time-intervals in which the power consumption of the pump is ascertained. In this case, in the time-intervals different rotational speeds of the pump arise in each instance, which have to be taken into consideration in the ascertainment of the power consumption of the pump. In the special case where a compensation or correction of the changes in rotational speed of the pump that have been brought about by reason of the change of load does not occur, the ascertainment of the power consumptions of the pump or the ascertainment of the correction factor can be effected directly on the basis of change in rotational speed.

However, a compensation or correction of the changes in rotational speed of the pump that have been brought about by reason of the change of load is to be preferred, since not only the entire electric drive of the valve arrangement by means of which the pressure difference is set but also the entire electric drive of the pump or of the electric motor driving the pump is included in the calibration.

It is to be emphasised that for the accuracy of the calibration according to the method according to the invention it is important that the power consumptions of the pump are ascertained when the rate of delivery of the pump is constant in the respective time-interval. This means that a time-interval in which the power consumption of the pump is ascertained starts only when a compensation or correction of the change in rotational speed of the pump brought about by reason of the change of load has occurred and in consequence a constant rate of delivery has been set.

Other advantages of this invention will become apparent to those skilled in the art from the following detailed description of the preferred embodiments, when read in light of the accompanying drawings.

DETAILED DESCRIPTION OF THE INVENTION

Figure 1:
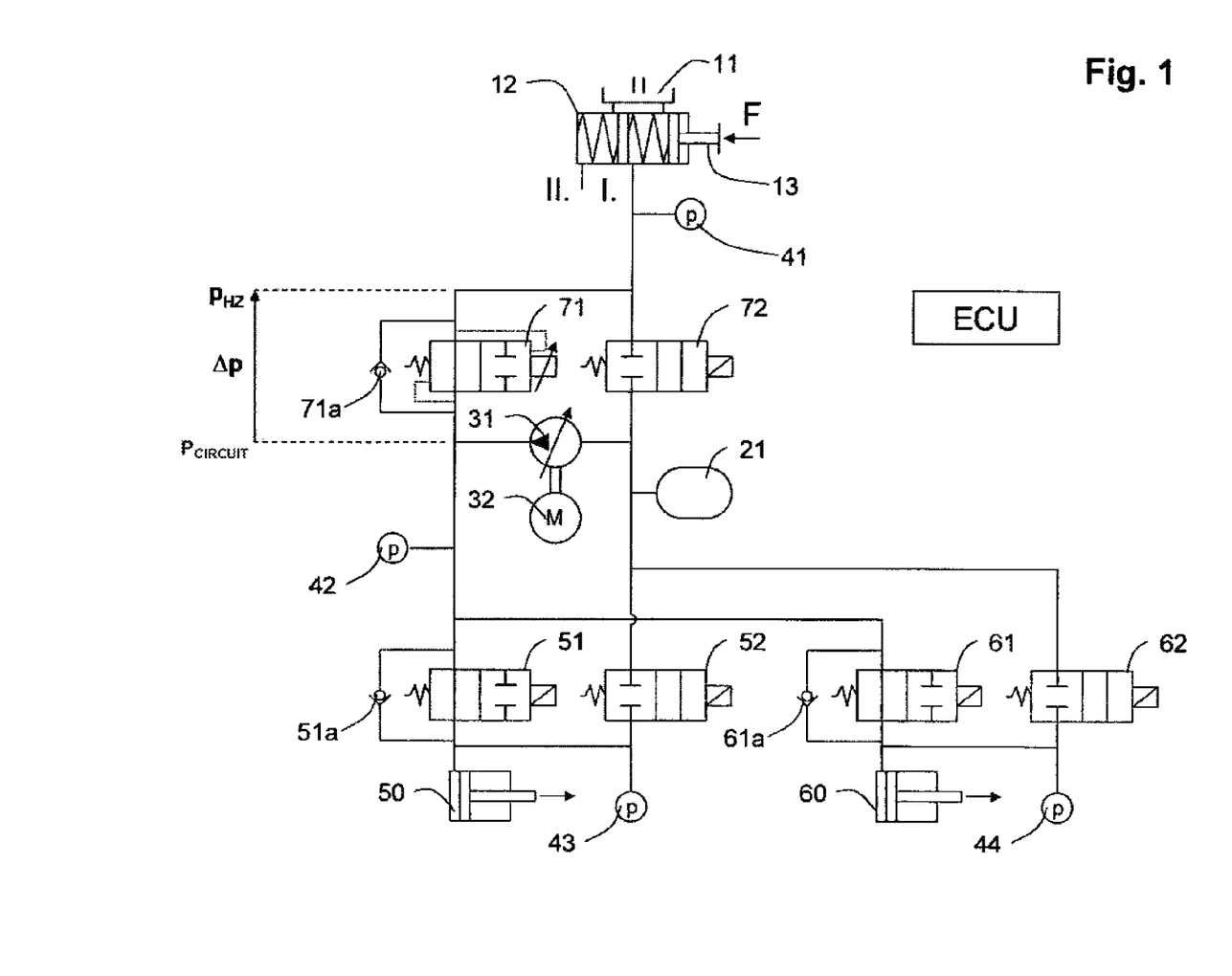
FIG. 1 is a hydraulic circuit diagram of a first exemplary embodiment of an electrically controllable brake system that is operated in accordance with the method according to the invention.

In FIG. 1 the hydraulic circuit diagram of an electrically controllable or adjustable brake system, which is also known by the term 'ESC system'—ESC stands for electronic stability control—is represented schematically.

The brake system operates by means of a hydraulic fluid which is stored, in part, in a container 11. A master (brake) cylinder 12, which has to be actuated by the driver by means of a pedal 13, serves for generating brake pressure which arises by pressurising the hydraulic fluid, the force F applied by the driver ordinarily being boosted—pneumatically, hydraulically or electromechanically—by a power brake unit (not represented in any detail).

Proceeding from the master cylinder 12, a first and second brake circuit I, II are supplied with brake fluid, each brake circuit supplying two wheel brakes with brake fluid. Since the brake circuits I, II are of substantially identical construction, here only the first brake circuit I is represented in detail, which generates brake pressure in the two wheel (brake) cylinders 50 and 60 in order to actuate the associated wheel brakes (not represented in any detail). Depending on which wheel brake of the vehicle is actuated via which brake circuit, a front-axle/ rear-axle partitioning arises, which means that the one brake circuit actuates the wheel brakes of the front axle, and the other those of the rear axle, or a diagonal partitioning arises, which means that each brake circuit actuates the wheel brake of a front wheel and that of the diagonally opposite rear wheel.

The hydraulic connection from the master cylinder 12 to the wheel cylinders 50 and 60 is determined by 2/2-way valves 51, 52, 61, 62, 71 and 72 actuated by electromagnets, which in the non-actuated state—that is to say, not electrically driven state—take up the initial positions represented. 'Initial position' here means, in detail, that valves 51, 61 and 71 each take up their flow position, valves 52, 62 and 72 each take up their blocking position.

For the purpose of executing normal braking operations—as a rule, initiated by the driver via the pedal 13—in the initial position of the valves 51, 52, 61, 62, 71 and 72 which is represented there is a direct hydraulic connection between the master cylinder 12 and the wheel cylinders 50 and 60. As a result, when the master cylinder 12 is actuated a brake pressure acts within the wheel cylinders 50 and 60, the magnitude of which depends on the force F applied by the driver on the pedal 13.

In an anti-lock control system (ABS) it is a question of preventing a locking of the wheels during a braking operation. For this purpose it is necessary to modulate the brake pressure acting within the wheel cylinders 50 and 60 individually. This is done by setting, in temporal succession, alternating pressure-build-up, pressure-maintenance and pressure-reduction phases which arise by suitable drive of valves 51, 52 and 61, 62 assigned to wheel cylinders 50 and 60, respectively.

During a pressure-build-up phase, valves 51, 52 and 61, 62 respectively take up their initial position, so that an increase in the brake pressure in the wheel cylinders 50 and 60 occurs, as in the case of a normal braking operation.

For a pressure-maintenance phase, only valve 51, respectively 61, is driven—that is to say, moved into its blocking position. Since a drive of valve 52, respectively 62, does not occur in this phase, said valve remains in its blocking position. As a result, the wheel cylinder 50, respectively 60, is hydraulically decoupled, so that a brake pressure prevailing in wheel cylinder 50, respectively 60, is kept constant.

In the case of a pressure-reduction phase, both valve 51, respectively 61, and valve 52, respectively 62, are driven—that is to say, valve 51, respectively 61, is moved into its blocking position, and valve 52, respectively 62, is moved into its flow position. Consequently, hydraulic fluid is able to flow out of the wheel cylinder 50, respectively 60, in order to reduce a brake pressure prevailing in the wheel cylinder 50, respectively 60.

Connected in parallel with valves 51 and 61 are, respectively, check valves 51a and 61a, via which an immediate reduction of a brake pressure prevailing in wheel cylinders 50 and 60 occurs if valves 51 and 61 are still being driven for a pressure-maintenance or pressure-reduction phase during ABS—that is to say, if they are in their blocking position—but the driver has already eased off the actuation of the pedal 13.

The hydraulic fluid flowing out of the wheel cylinder 50, respectively 60, during a pressure-reduction phase is conveyed back into the brake circuit I by means of a pump 31 driven by an electric motor 32, in which connection a low-pressure reservoir 21 serves for temporarily storing hydraulic fluid. The pump 31 is preferentially constructed as a radial-flow pump or multi-piston pump. The electric drive or power supply of the electric motor 32 is ordinarily effected by pulse-width modulation (PWM), via which the rotational speed of the electric motor 32 is controllable or adjustable, so that the volumetric delivery or rate of delivery of the pump 31 can be adjusted. It is also customary that the electric motor 32 simultaneously drives the pump of the second brake circuit II (not represented in detail).

Automatic braking operations occur, as a rule, independently of a force F applied by the driver on the pedal 13. Such braking operations are, for example, a traction control system (ASR/TCS), which prevents individual wheels from spinning in the course of a start-up procedure by selective deceleration, or an electronic stability program (ESP), which adapts the behaviour of the vehicle within the limiting range to the wish of the driver and to the road conditions by selective deceleration of individual wheels, or an adaptive cruise control (ACC), which by, inter alia, automatic braking maintains a spacing of one's own vehicle from a vehicle in front, or a hill descent control (HDC), which monitors and keeps constant the speed and directional stability of a vehicle when driving downhill on loose ground or on a road with low coefficient of friction, such as snow, inter alia by means of brake engagements.

For the purpose of executing automatic braking operations, valves 71 and 72 are driven, so that valve 71 takes up its blocking position and valve 72 takes up its flow position. As a result, on the one hand the output of the pump 31 has been hydraulically decoupled from the brake circuit I or, to be more exact, from the master cylinder 12, which means a direct hydraulic connection exists only below the output of the pump 31 and the wheel brakes 50 and 60. On the other hand, there is a hydraulic connection of the input of the pump 31 to the master cylinder 12 or, to be more exact, to the container 11, by virtue of which the pump 31 is able to draw hydraulic fluid out of the container 11 in order to generate brake pressure in the wheel brakes 50 and 60. A fine setting or modulation of the brake pressure can be undertaken by appropriate drive of valves 51, 52 and 61, 62 assigned to wheel brakes 50 and 60, respectively, as elucidated in connection with ABS.

Connected in parallel with valve 71 is a check valve 71a, via which, upon actuation of the pedal 13, for example during ESP, the driver can build up or increase a brake pressure even when valve 71 is in its blocking position.

As generally known, an electronic control unit ECU undertakes the electric drive of the valves 51, 52, 61, 62, 71 and 72 and also of the electric motor 32. This is done in a manner depending, on the one hand, on measured variables describing the behaviour of the vehicle (e.g. wheel speeds, driving speed, yaw velocity, transverse acceleration, longitudinal acceleration) and, on the other hand, on measured variables describing the wish of the driver (e.g. actuation of the pedal 13, steering-wheel angle).

By way of measured variable describing the wish of the driver, optionally the brake pressure $p_{MC}$ generated in the master brake cylinder 12 can also be drawn upon, which can be registered by means of a sensor 41.

Valve 71 takes the form of a valve arrangement 71, by means of which a pressure difference Δp can be set by suitable electric drive. The mode of operation of such a valve arrangement is described in DE 10 2005 026 740 A1. The electric drive or power supply of valve arrangement 71 is effected in known manner by pulse-width modulation (PWM), the pulse/pause ratio of which can be set, so that, depending thereon, the pressure difference Δp is controllable or adjustable as a function $$\Delta p = f(PWM)$$

whereby the pressure difference $\Delta p$ corresponds to the difference of the brake pressure $p_{CIRCUIT}$ generated at the output of the pump 31 and the pressure $p_{MC}$ generated at the output of the master cylinder 12.

$$\Delta p = p_{CIRCUIT} - p_{MC}$$

Consequently the brake pressure $p_{CIRCUIT}$ can, in the sense of a drainage regulation, be continuously controlled or regulated directly via the pressure difference $\Delta p$, whereby a set-point value S for the pressure difference $\Delta p$ can be set by means of the PWM of the power supply of valve arrangement 71.

In the cases where automatic braking procedures occur independently of a force F applied by the driver on the pedal 13, $p_{MC}=0$ bar, so the brake pressure $p_{CIRCUIT}$ corresponds directly to the pressure difference $\Delta p$.

Optionally there may be provision to register the brake pressure $p_{CIRCUIT}$ at the output of the pump 31 by means of a sensor 42.

In order to increase still further the accuracy of the pressure-difference control or regulation by means of valve arrangement 71, for the purpose of fine control the volumetric delivery or rate of delivery of the pump 31 can be adjusted in assisting manner, by the rotational speed of the electric motor 32 driving the pump 31 being controlled or regulated appropriately.

For the purpose of calibrating the brake system or valve arrangement 71, firstly valve 72 is driven in such a way that it takes up its flow position and the pump 31 is able to draw hydraulic fluid out of the container 11. Moreover, valve arrangement 71 is driven in such a way that a pressure difference $\Delta p$ arises between the output of the pump 31 and the master cylinder 12. Consequently the pump 31 conveys in a circuit via valve arrangement 71 and valve 72, whereby the load opposing the pump 31 is determined by the pressure difference $\Delta p$ that was set at valve arrangement 71. Therefore, provided that a defined speed of the pump or a defined rate of delivery of the pump is taken as a basis, there is a direct relationship between the pressure difference $\Delta p$ and the power consumption P of the pump 31.

$$P = f(\Delta p)$$

The power consumption P of the pump 31 is ascertained within a time-interval $\Delta t$ from the temporal progression of the electric drive or power supply of the electric motor 32 driving the pump 31.

Figure 2:
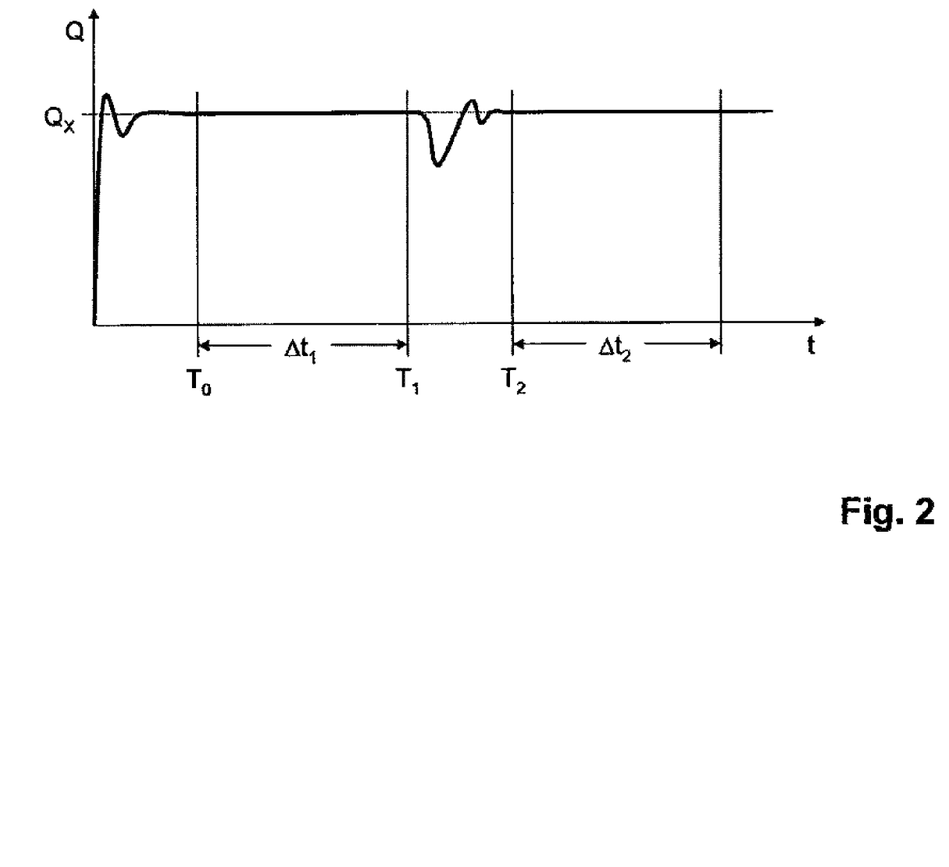
FIG. 2 is a rate-of-delivery/time diagram, on the basis of which the sequence of operations of a preferred exemplary embodiment of the method according to the invention will be elucidated.
Figure 3:
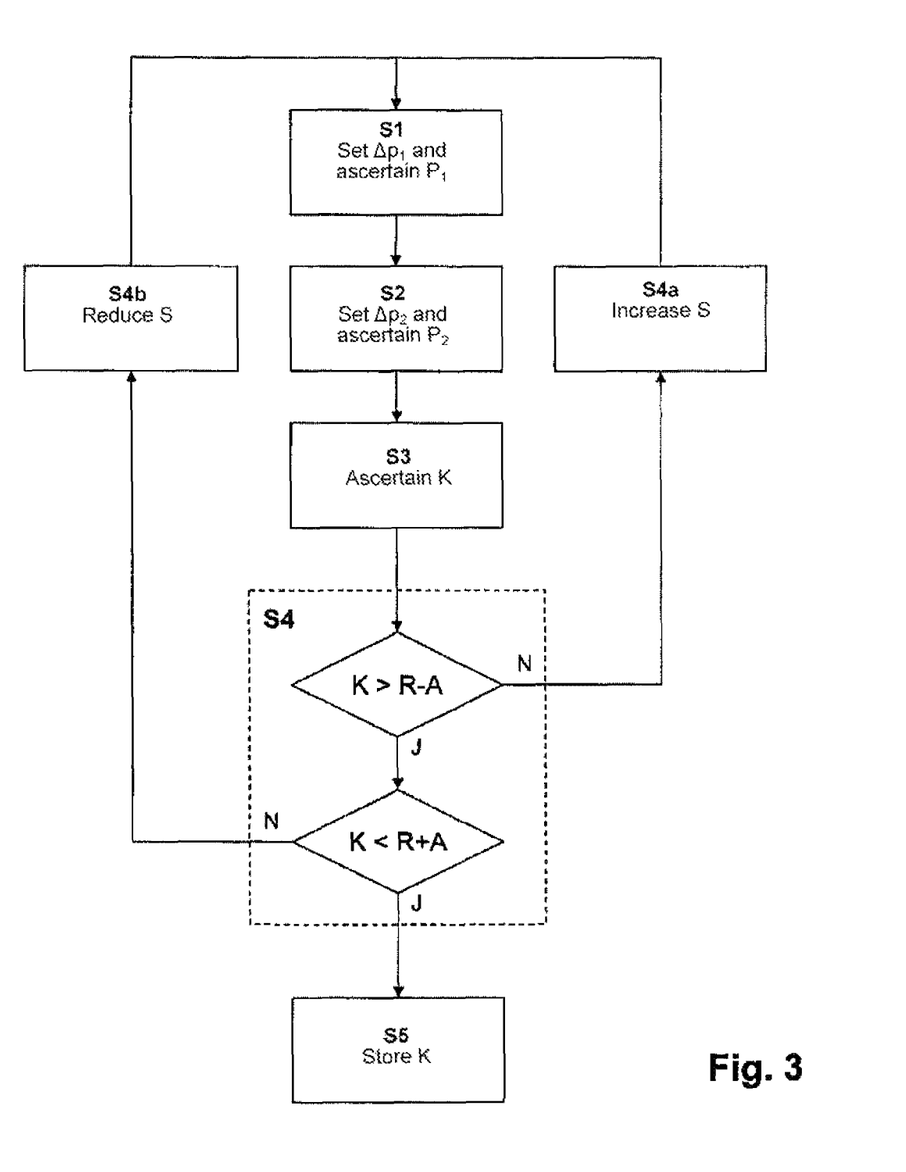
FIG. 3 is a flow chart, on the basis of which the sequence of operations of a preferred exemplary embodiment will be elucidated.

The sequence of operations of the calibration is represented as a flow chart in FIG. 3. In a first step S1, valve arrangement 71 is driven in such a way that a first pressure difference $\Delta p_1$ arises. In preferred manner, valve arrangement 71 is driven in such a way for this purpose that it takes up its flow position, by virtue of which the first pressure difference $\Delta p_1$ is predetermined to a value of the order of magnitude zero ($\Delta p_1 \sim 0$ bar). As the rate-of-delivery/time diagram in FIG. 2 shows, the pump 31 is now controlled or regulated in such a way that a defined rate of delivery $Q_x$ arises. As soon as, at time $T_0$, the rate of delivery Q of the pump 31 is constant, a first time-interval $\Delta t_1$ begins, in which a first power consumption $P_1$ of the pump 31 corresponding to the first pressure difference $\Delta p_1$ is ascertained.

After the first time-interval $\Delta t_1$ has elapsed—that is to say, at time $T_1$—in a second step S2 valve arrangement 71 is driven in such a way that a second pressure difference $\Delta p_2$ arises which is greater than the first pressure difference $\Delta p_1$ (e.g. $\Delta p_2 \sim 3$ bar). The increase in the pressure difference results firstly, as represented in FIG. 2, in a drop in the rate of delivery, but as soon as the defined rate of delivery $Q_x$ has been reset by increasing the power supply of the electric motor 32 driving the pump 31, and at time $T_2$ is constant, a second time-interval $\Delta t_2$ begins, in which a second power consumption $P_2$ of the pump 31 corresponding to the second pressure difference $\Delta p_2$ is ascertained.

In preferred manner, not only the pump 31 is driven in such a way that in the first time-interval $\Delta t_1$ and in the second time-interval $\Delta t_2$ a rate of delivery of the same magnitude is achieved, but also for the first time-interval $\Delta t_1$ and the second time-interval $\Delta t_2$ the same period of time is chosen (e.g. $\Delta t_1 = \Delta t_2 \sim 1$ s).

Thereupon, in a third step S3, a correction value K is ascertained from the first power consumption $P_1$ and the second power consumption $P_2$, for which purpose, for example, a ratio is derived from the first power consumption $P_1$ and the second power consumption $P_2$.

$$K = P_2 / P_1$$

Since in the second time-interval $\Delta t_2$ a larger pressure difference was set than in the first time-interval $\Delta t_1$ ($\Delta p_2 > \Delta p_1$), the power consumption in the second time-interval $\Delta t_2$ is greater than the power consumption in the first time-interval $\Delta t_1$ ($P_2 > P_1$). Therefore the correction value K must have a value greater than one (K>1).

Now if a value of the correction value K is ascertained that does not lie within a predetermined range, for which in this case K>1 holds, the existence of a system error can be inferred.

In a fourth step S4, the correction value K is compared with a reference value R, and the set-point value S for the pressure difference $\Delta p$ is set in such a way that the correction value K approaches the reference value R. If, for example, a correction value of K=1.2 is ascertained, and if a reference value of R=1.5 is predetermined, then, assuming $K=P_2/P_1$, in an intermediate step S4a the set-point value S for the pressure difference $\Delta p$ is increased. Therefore, upon repetition of steps S1 to S3, at least in the second time-interval $\Delta t_2$ a higher power consumption $P_2$ than in the case of the preceding execution of steps S1 to S3 will arise, resulting in an increase in the correction value K, and consequently in an approximation to the reference value R.

Analogously, in an intermediate step S4b the set-point value S for the pressure difference $\Delta p$ is reduced if a correction value is ascertained that is greater than the reference value.

The comparison of the correction value K with the reference value R and the setting of the set-point value S for the pressure difference $\Delta p$ are repeated until such time as the correction value K has approached the reference value R within a predetermined deviation A. Accordingly, the correction value K is approximated to the reference value R iteratively. If, for example, a deviation of $A=\pm 0.1$ is predetermined, then in the case of a reference value of R=1.5 a range of 1.4<R<1.6 results. As soon as a value of the correction value K is ascertained that lies within this range (R−A<K<R+A), this value is saved or stored as correction value K in the electronic control unit ECU in a fifth step S5. With this, the calibration of valve arrangement 71 is concluded.

If a termination of the calibration occurs during steps S1 to S4, for example because the driver of the vehicle initiates a braking operation, the correction value K last ascertained is saved or stored in the electronic control unit ECU and is then available as initial value for the next calibration.

The correction value K ascertained or updated in this way is then taken into consideration for future electric drives of valve arrangement 71 for the purpose of setting a set-point value S for the pressure difference $\Delta p$, for example by the PWM of the power supply of valve arrangement 71 being adapted by means of the correction value K by way of offset or factor.

$$\Delta p = f(PWM \pm K)$$

or $$\Delta p = f(PWM \cdot K)$$

There is also provision that the existence of a system error is inferred if the approximation of the correction value K to the reference value R has not occurred within a predetermined period of time and/or after a predetermined number of repetitions.

The reference value R is known from laboratory investigations and is likewise stored in the electronic control unit ECU. Since the reference value is different for various pressure differences Δp, the reference value R may be predetermined in a manner depending on the first and/or second pressure difference $\Delta p_1$, $\Delta p_2$ and, for example, may have been saved or stored as a characteristic map in the electronic control unit ECU. This is necessary, above all, when the calibration of valve arrangement 71 is to be carried out for various operating points, i.e. for various pressure differences Δp.

In order that, upon implementation of the method according to the invention, a generation or change of the brake pressure in the wheel cylinders 50 and 60 is prevented, for example when the vehicle is in motion, there may be provision that at least one of the valves 51 and 61 assigned to the wheel cylinders 50 and 60, respectively, is driven in such a way that it takes up its blocking position.

Figure 4:
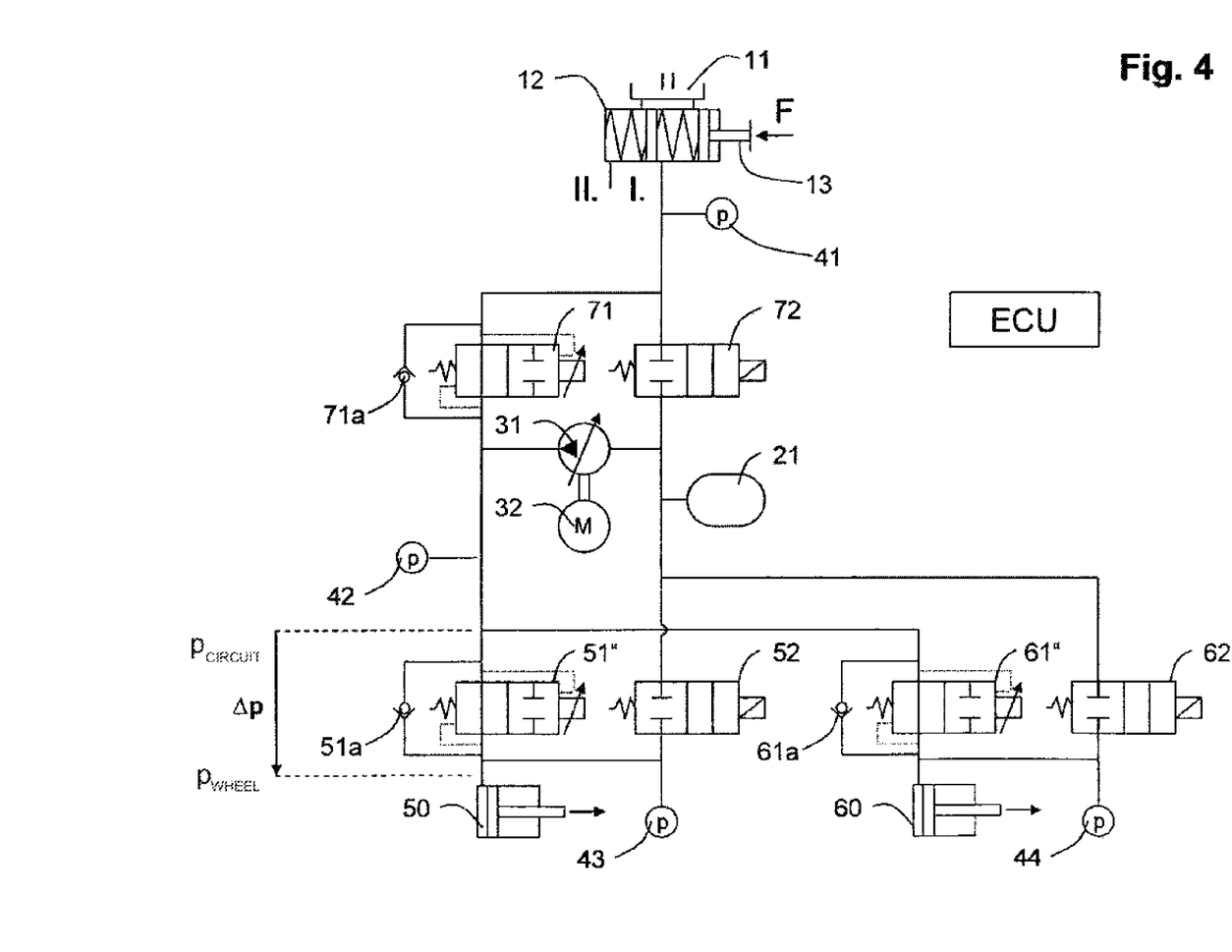
FIG. 4 is a hydraulic circuit diagram of a second exemplary embodiment of an electrically controllable brake system that is operated in accordance with the method according to the invention, wherein identical parts have been provided in each instance with identical reference symbols.

In FIG. 4 the hydraulic circuit diagram of an electrically controllable or adjustable brake system is represented, wherein in comparison with FIG. 1 valves 51 and 61 likewise take the form of a valve arrangement 51" and 61", respectively, by means of which a pressure difference Δp can be set by suitable electric drive, as known from DE 102 47 651 A1. In this connection the pressure difference Δp corresponds to the difference of the brake pressure $p_{CIRCUIT}$ generated at the output of the pump 31 and the brake pressure $p_{WHEEL}$ generated in the wheel cylinder 50 and 60.

$$\Delta p = p_{CIRCUIT} - p_{WHEEL}$$

Optionally there may be provision to register the brake pressure $p_{WHEEL}$ generated in the wheel cylinders 50 and 60 by means of sensors 43 and 44, respectively.

For the purpose of calibrating the brake system or the valve arrangements 51" and 61", valve arrangement 71 is firstly driven in such a way that it takes up its blocking position.

In order to calibrate valve arrangement 51", on the one hand valve arrangement 61" assigned to wheel cylinder 60 is driven in such a way that it takes up its blocking position, and, on the other hand, valve 52 is driven in such a way that it takes up its passing position. Consequently the pump 31 is able to convey in a circuit via valve arrangement 51" and valve 52, whereby the load opposing the pump 31 is determined by the pressure difference Δp that was set at valve arrangement 51".

In order to calibrate valve arrangement 61", on the one hand valve arrangement 51" assigned to wheel cylinder 50 is driven in such a way that it takes up its blocking position, and, on the other hand, valve 62 is driven in such a way that it takes up its passing position. Consequently the pump 31 is able to convey in a circuit via valve arrangement 61" and valve 62, whereby the load opposing the pump 31 is determined by the pressure difference Δp that was set at valve arrangement 61".

The actual calibration of valve arrangements 51" and 61" may then proceed in a manner analogous to that elucidated in connection with the calibration of valve arrangement 71.

Since in the course of a calibration of valve arrangements 51" and 61" a generation or change of a brake pressure $p_{WHEEL}$ in the wheel cylinders 50 and 60 cannot be prevented, in preferred manner this is carried out only when the vehicle is not in motion or when for the purpose of calibration only relatively small pressure differences (e.g. Δp<3 bar) are set, which barely have a perturbing effect.

In conclusion, it may be mentioned that preferred embodiments of the invention have been elucidated on the basis of FIGS. 1 to 4 in exemplary manner, for which reason it is within the discretion of a person skilled in the art to undertake modifications and combinations within the scope of the Claims and the description. This holds, in particular, with regard to the optional use of sensors 41, 42, 43 and 44 for registering the brake pressures $p_{MC}$, $p_{CIRCUIT}$ and $p_{WHEEL}$, by virtue of which the setting—relevant for the method according to the invention—of predetermined pressure differences Δp can be effected very precisely, so that a particularly accurate calibration results.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method for operating an electrically controllable brake system for a motor vehicle with a master cylinder for generating a first brake pressure, with an electrically driven pump for generating a second brake pressure, and with at least one electrically driven valve arrangement for setting a pressure difference between the second brake pressure and the first brake pressure, wherein:

in a first time-interval a predetermined first pressure difference is set and an associated first power consumption of the pump is ascertained, in a second time-interval a predetermined second pressure difference is set and an associated second power consumption of the pump is ascertained, a correction value is ascertained from the first power consumption and the second power consumption, and the correction value taken into consideration for the purpose of setting a set-point value for the pressure difference.

2. A method for operating an electrically controllable brake system for a motor vehicle with wheel cylinders in which a first brake pressure is generated, with an electrically driven pump for generating a second brake pressure, and with at least one electrically driven valve arrangement for setting a pressure difference between the second brake pressure and the first brake pressure, wherein:

in a first time-interval a predetermined first pressure difference is set and an associated first power consumption of the pump is ascertained, in a second time-interval a predetermined second pressure difference is set and an associated second power consumption of the pump is ascertained, a correction value is ascertained from the first power consumption and the second power consumption, and the correction value is taken into consideration for the purpose of setting a set-point value for the pressure difference.

3. The method according to claim 1, wherein a termination of the method occurs if a braking operation initiated by a driver of the vehicle and/or an automatic braking operation occurs.

4. The method according to claim 1, wherein a termination of the method occurs if a braking operation is imminent.

5. The method according to claim 1, wherein for the purpose of ascertaining the correction value a ratio is derived from the first power consumption and the second power consumption.

6. The method according to claim 1, wherein for the purpose of ascertaining the correction value a difference is derived from the first power consumption and the second power consumption.

7. The method according to claim 5, wherein an existence of a system error is inferred if a value of the correction value is ascertained that does not lie within a predetermined range.

8. The method according to claim 1, wherein the first pressure difference or the second pressure difference is set to a value of an order of magnitude zero.

9. The method according to claim 1, wherein the first time-interval and the second time-interval are of a same duration.

10. The method according to claim 1, wherein the first time-interval and the second time-interval are of different duration.

11. The method according to claim 1, wherein the pump is driven in such a way that in the first time-interval and in the second time-interval a rate of delivery of a same magnitude is achieved.

12. The method according to claim 1, wherein the pump is driven in such a way that in the first time-interval and in the second time-interval rates of delivery of differing magnitude are achieved.

13. The method according to claim 1, wherein the first and second power consumptions are ascertained if in the respective first and second time-intervals the rate of delivery of the pump is constant.

14. The method according to claim 1, wherein the correction value is compared with a reference value, and the set-point value for the pressure difference is set in such a way that the correction value approximates to the reference value.

15. The method according to claim 14, wherein the comparison of the correction value with the reference value and the setting of the set-point value for the pressure difference are repeated until such time as the correction value has approximated to the reference value within a predetermined deviation.

16. The method according to claim 14, wherein the existence of a system error is inferred if the approximation of the correction value to the reference value has not occurred within a predetermined period of time and/or after a predetermined number of repetitions.

17. The method according to claim 14, wherein the reference value is predetermined in a manner depending on the first and/or second pressure difference.

18. An electrically controllable brake system that is operated in accordance with a method according to claim 1.

19. The method according to claim 6, wherein an existence of a system error is inferred if a value of the correction value is ascertained that does not lie within a predetermined range.

20. The method according to claim 2, wherein a termination of the method occurs if a braking operation initiated by a driver of the vehicle and/or an automatic braking operation occurs.

21. The method according to claim 2, wherein a termination of the method occurs if a braking operation is imminent.

22. The method according to claim 2, wherein for the purpose of ascertaining the correction value a ratio is derived from the first power consumption and the second power consumption.

23. The method according to claim 2, wherein for the purpose of ascertaining the correction value a difference is derived from the first power consumption and the second power consumption.

24. The method according to claim 22, wherein an existence of a system error is inferred if a value of the correction value is ascertained that does not lie within a predetermined range.

25. The method according to claim 2, wherein the first pressure difference or the second pressure difference is set to a value of an order of magnitude zero.

26. The method according to claim 2, wherein the first time-interval and the second time-interval are of a same duration.

27. The method according to claim 2, wherein the first time-interval and the second time-interval are of different duration.

28. The method according to claim 2, wherein the pump is driven in such a way that in the first time-interval and in the second time-interval a rate of delivery of a same magnitude is achieved.

29. The method according to claim 2, wherein the pump is driven in such a way that in the first time-interval and in the second time-interval rates of delivery of differing magnitude are achieved.

30. The method according to claim 2, wherein the first and second power consumptions are ascertained if in the respective first and second time-intervals the rate of delivery of the pump is constant.

31. The method according to claim 2, wherein the correction value is compared with a reference value, and the set-point value for the pressure difference is set in such a way that the correction value approximates to the reference value.

32. The method according to claim 31, wherein the comparison of the correction value with the reference value and the setting of the set-point value for the pressure difference are repeated until such time as the correction value has approximated to the reference value within a predetermined deviation.

33. The method according to claim 31, wherein the existence of a system error is inferred if the approximation of the correction value to the reference value has not occurred within a predetermined period of time and/or after a predetermined number of repetitions.

34. The method according to claim 31, wherein the reference value is predetermined in a manner depending on the first and/or second pressure difference.

35. An electrically controllable brake system that is operated in accordance with a method according to claim 2.

36. The method according to claim 23, wherein an existence of a system error is inferred if a value of the correction value is ascertained that does not lie within a predetermined range.

* * * * *